May 26, 1936.  E. E. WOODWARD  2,041,804
AUTOMOBILE SIDE WING
Filed April 16, 1935
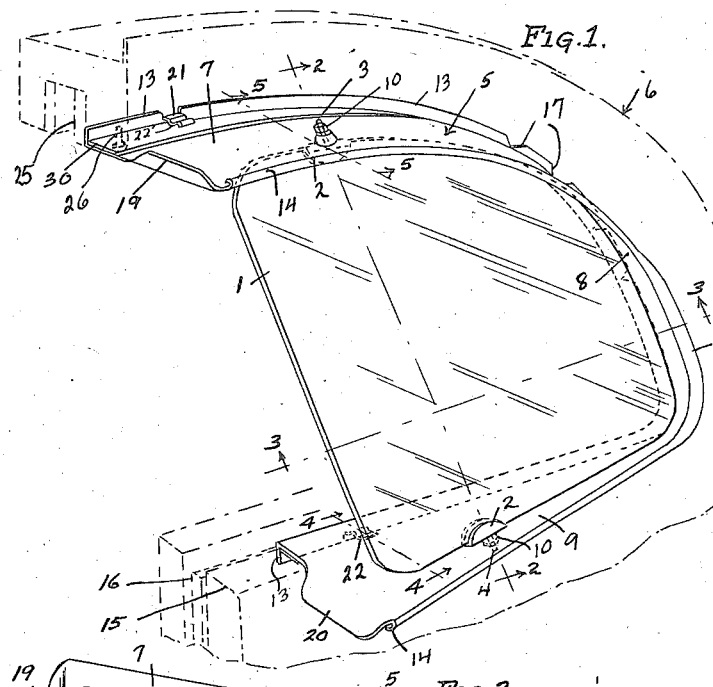
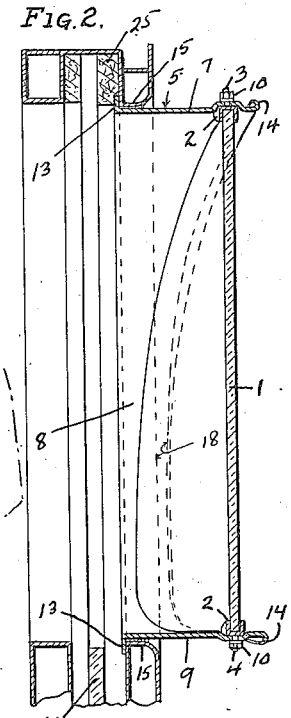
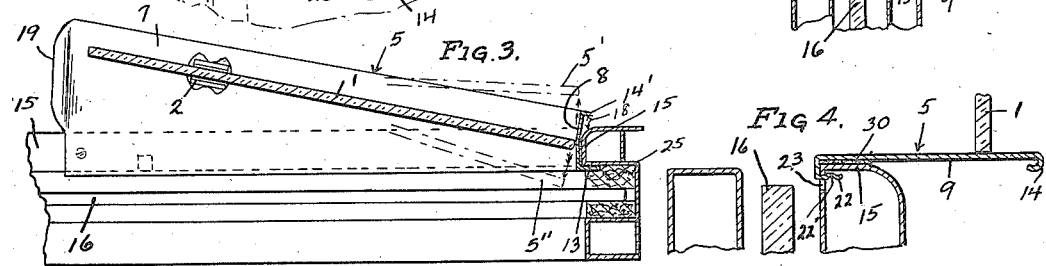
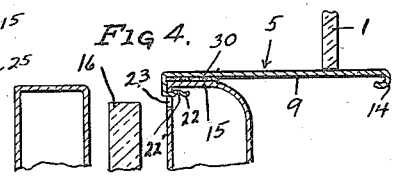
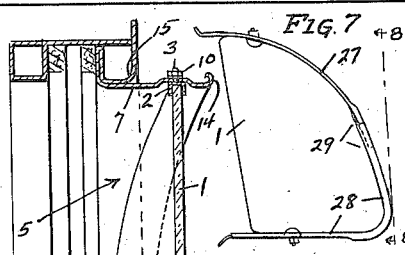
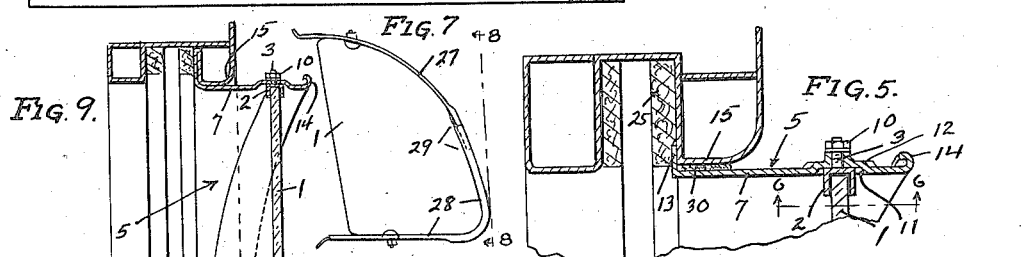
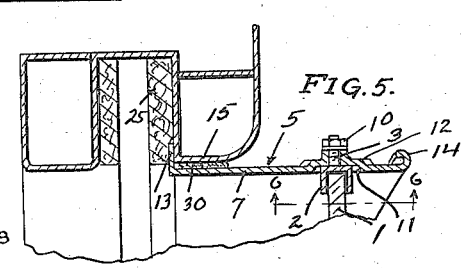
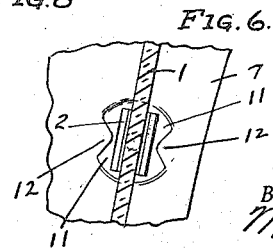
INVENTOR.
EMMETT E. WOODWARD
BY
Miller Boykin & Reed
ATTORNEYS.

Patented May 26, 1936

2,041,804

UNITED STATES PATENT OFFICE 2,041,804

AUTOMOBILE SIDE WING

Emmett E. Woodward, San Mateo, Calif., assignor to James P. Callahan, San Francisco, Calif.

Application April 16, 1935, Serial No. 16,597

9 Claims. (Cl. 296—84)

This invention relates to side windshields for automobiles commonly known as "side wings" for deflecting wind, rain, sleet and the like away from window openings of the automobile, and the objects of the invention are to provide a construction that fully encloses the side wing along its upper, forward and lower edges against ingress of rain and the like to inside the automobile when the glass of the window is down, and which construction also provides a secure mounting for the side wing. Other objects and advantages will appear in the specification and drawing.

In the drawing, Fig. 1 is a perspective view of one of my side wings and its mounting as seen from outside the automobile, a portion of the automobile door and its window opening being indicated in dotted line.

Fig. 2 is a generally vertical sectional view taken along the line 2—2 of Fig. 1, a portion of the automobile door being also shown in section.

Fig. 3 is a horizontal sectional view taken along the line 3—3 of Fig. 1 looking upward, part of the automobile door being shown in section and in elevation.

Fig. 4 is an enlarged sectional view as seen from line 4—4 of Fig. 1.

Fig. 5 is an enlarged sectional view as seen from line 5—5 of Fig. 1.

Fig. 6 is a sectional view of a portion of Fig. 5 as seen from line 6—6 of Fig. 5.

Fig. 7 is a small side elevation of a slightly modified form of the invention.

Fig. 8 is a front elevation of Fig. 7 as seen from line 8—8 of Fig. 7.

Fig. 9 is still another form of my invention in section, the view being similar to that of Fig. 2 insofar as the line along which the section is taken is concerned.

In detail, my side wing comprises a glass shield 1, provided at its upper and lower edges respectively with U-shaped members 2, each adapted to embrace the edge of the shield with rubber or fibrous material tightly gripped between the inner sides of the member and glass for securing the member to the shield. Each of the members 2 is provided with a short, outwardly projecting bolt 3 (upper) 4 (lower) coaxially aligned, said bolts respectively extending through an opening in the upper and lower runs of a horizontally disposed generally U-shaped plate or frame 5.

The frame 5 comprises a flat, sheet metal plate, such as sheet steel or iron, of elongated shape, bent transversely of its plane to a generally U-shape to fit against and follow the upper, forward and lower reveal of a door window opening of an automobile, the plane of the plate extending transversely of the plane of the door window opening. The general form of the door of an automobile and the window opening thereof in which my frame is adapted to be used is indicated in dotted line at 6 in Fig. 1, in which the opening becomes progressively lesser in vertical dimension from the rear reveal to the front reveal. The outline at the forward upper corner of the opening defines a relatively flat curve as compared with the lower forward corner and the forward reveal slants downwardly and forwardly rather steeply between the upper and lower corners. The lower reveal extends generally horizontally. The shield 1 is positioned generally vertically within the frame 5 with its upper, forward and lower edges, including the forward corners conforming in outline to the shape of the frame so that it fits relatively snugly along said edges against the inner side of the frame. The rear edge of the shield is exposed and terminates short of the rear ends of the frame, said rear edge being inclined forwardly and downwardly from the upper rear corner of the shield, the upper and lower rear corners of the shield being rounded.

To facilitate description, the upper run of plate 5 will be designated 7, the forward inclined run 8, and the lower run 9.

Portions 7 and 9 are provided with openings, as already explained, through which the bolts 3 rotatably extend to the upper and lower outer sides of said portions and nuts 10 threadedly engage the outer ends of the bolts for securing the plate of the frame between the nuts and members 2. The plate or frame 5 adjacent one or both of said openings is outwardly recessed as indicated in Figs. 5 and 6 at 11 to seat the side of members 2 that extend across the edge of the shield, thus enabling the edge of the shield to fit relatively close to the inner side of the frame. Otherwise the edges of the shield would be notched to receive members 2, which would add to expense and possible chipping of the glass of the shield. Recess 11 is formed at opposite sides with generally wedge-shaped projections 12 terminating at the apex adjacent the opening through which the bolt 3 extends. These projections may be on only one side, and provide a stop to limit the pivoting of the shield in two opposite directions, since the member 2 will engage one or the other side of the wedge-shaped projection when the wing is pivoted. This insures against the wind whipping the shield beyond the desirable point when the shield is pivoted in one direction or the other as indicated in dotted lines in Fig. 3 at 5' and 5''. Of course, the friction at the pivots of the shield is adjustable according to the tightness of the nuts on bolts 3.

The frame 5 is relatively narrow along the forward portion 8 and gradually becomes wider at portions 7 and 9 as indicated in Fig. 3, in particular.

Along its opposite longitudinally extending edges the frame 5 is provided with outwardly turned flanges, the flange 13 extending along what will be termed the inner edge of the frame and flange 14 being along the outer edge thereof.

The inner flange 13 extends generally perpendicular to the plane of the plate forming the frame 5 and in the drawing this flange is shown as adapted to engage against the inner side of that portion 15 of the window reveal that lies to the outer side of the sliding glass 16 of the door, thus the plate of frame 5 extends transversely across the reveal 15 to outside the automobile and outer flange 14 along portions 7 and 9 and extends rearwardly divergently outwardly from the opposite ends of forward portion 8. Interposed between the reveal 15 and the outer side of the frame is a felt or rubber strip 30 to prevent marring the reveal by the frame. The flange 13 is notched at 17 at spaced points along the upper forward corner and forward run of frame 5 to facilitate slight modifications of the curve of the frame to accommodate slight variations in the outline of the reveal, since opposite window openings in the same automobile may vary slightly.

The outer flange 14 is curled back along portions 7 and 9 so as to present a smooth outer edge to the frame, but projects outwardly of the frame whereby the flange along portion 7 in particular is adapted to coact with the reveal 15 to form a channel between the reveal and flange. This channel is adapted to prevent rain and the like from running over the outer edge of the frame and to direct the same rearwardly as the car moves forward, or to drain the rain and the like down the portion 8. Instead of being curled back to the degree of the curl along portions 7 and 9, the outer flange 14 is straightened at 14' along the portion 8 and so a relatively narrow and deep channel 18 (see Fig. 3) of substantially uniform width extends along the portion 8.

By reducing the width of the frame at 8, there is substantially no obstruction to the vision of the driver. Also, since the frame projects outward of the forward edge of the shield along the portion 8, the rain does not strike the forward portion of the shield, and vision is clear at such portion; also the rain that strikes the shield rearward of the forward edge is deflected rearwardly away from the window opening.

The rear ends of the plate forming frame 5 are oppositely upwardly and downwardly curved at 19, 20, along the rear edges at the upper and lower portions of the frame respectively, thus deflecting the wind and rain away from the window opening. Otherwise there is a tendency for the air drafts to be drawn over the rear ends of the frame and into the window opening. It is important that the portions 19, 20 be curved generally as indicated in Fig. 1, since a sharp angle would create objectionable whistling of wind and would tend to catch rain rather than to deflect it. As indicated in Fig. 1, the curved portions 19, 20 stop short of the reveal of the window opening so as to allow the reveal to snugly engage the outer side of the frame.

In Fig. 3, attention is called to the fact that the portion 8 of the frame lying to the outer side of the reveal of the door is formed to extend slightly at an angle to the plane of the portion that extends across reveal 14, so as to permit free swinging of the shield 1.

In securing my frame to the automobile, several methods may be employed, or, as indicated in Fig. 9, the frame may be an integral part of the door by utilizing the portion of the sheet metal door that is ordinarily cut out to provide the window opening.

The method preferably employed in Fig. 1 is to form small spring lips 21, 22 (upper and lower) along flange 13, which lips are bent toward flange 14 over the outer side of the frame. These lips are oppositely inwardly bowed toward each other at 22' intermediate their ends. The inner side of the portion of the door to the outer side of the sliding glass, and adjacent the reveal, is slotted at 23 to receive these lips 21, 22 with the bowed portion adapted to snap over the edge of the slot and to thus prevent withdrawal of the frame or movement of the frame relative to the door, although with a suitable instrument the lips 21, 22 may be easily sprung to disengage from the edge of the slot.

In installing the side wing, including the frame, the frame is inserted in the door window opening at its widest portion (vertically) and is then moved forward to a position with the flange 13 along portion 8 between the felt strip 25 and reveal 15 and the the portion of the flange along portion 7 is similarly positioned. The portions 7 and 9 of the frame are adapted to be forced toward each other by engagement with the rigid converging upper and lower reveals, since the pivots at the upper and lower edges of the shield 1 are adjacent flange 14 hence do not interfere with the springing of the edge of the frame opposite flange 14, so as to create a spring tension against the reveal thus accommodating the shield to variations in the sizes of the window openings. The slots 23 in the door are so positioned that when portion 8 engages tightly against the forward reveal of the window opening, the lips 21, 22 will pass into the slots and engage therein as already explained. Thus the frame 5 is very tightly held in position, both by the lips 21, 22, and by the inherent spring in portions 7 and 9 whereby these portions tend to spring outwardly but are held by the reveal.

I may also tap the upper and lower reveals or the upper reveal only and by screw 26, passing through the plate and threadedly engaging the reveal, secure the frame in position, and this screw alone may be used without the lips 21, 22 or in conjunction with them as desired. However, the use of the lips gives a better appearance and makes for easier installation, since the door of the automobile is generally provided along the lower window reveal, at least, with slots, now used for rubber rollers or guides, or an extra slot or slots may be provided for the lips, as desired. Flange 13, being of relatively thin sheet metal, approximately the same gauge as the metal of the door, does not in any way interfere with the sliding of the window glass 16.

In the form shown in Figs. 7 and 8, the frame is made in two sections 27 (upper) 28 (lower) telescoping along forward portion 29 so as to permit vertical extension of the frame to fit window openings that are similar in curvature at the corners but of varying height. The inner flange 13 on these portions 27, 28 is cut away in this form so as to not take up unnecessary space at the overlap, and portion 27 laps over the outer side of portion 28 to drain the rain over the portion 29 without leakage to inside of the automobile. The glass, in this form, must, of course, be changed to fit if there is an extensive variation in the height of the window opening, but the frame will not require change.

Fig. 9 has already been briefly mentioned, and this form is particularly suitable for factory jobs where the doors are made. It will be seen that the elements are substantially the same as in Fig. 1, except that the door itself is formed to provide the frame for the side windshield and such construction is intended to come within the scope of the invention.

Insofar as I am aware, heretofore no one has provided a continuous frame embracing the side windshield of an automobile, which frame is adapted to seal the divergently extending shield against ingress of rain around the forward upper and lower edges thereof, and which frame defines the outline of the window opening at its upper, forward and lower edges, whether such frame is separable from the door of the automobile or formed therewith. Nor am I aware of a frame provided with a flange along its outer edge substantially continuous therewith along the upper and forward portions thereof as shown in the drawing.

The pivoting of the windshield in such frame, as defined and shown in the drawing, also permits air to be directly diverted into the automobile or when turned to the position 5'' in Fig. 3, to permit ventilation without undue draft. The stop 12 is so formed to prevent pivoting of the windshield inwardly farther than is indicated at 5'', and thereby prevents the shield from crossing over the upper edge of sliding glass 16. Heretofore, unless the shield overlaps the window opening top and bottom, there have been many breakages of the shield, or chipping of the sliding glass of the door window due to the operator raising the sliding glass when the windshield was positioned across the sliding glass.

It is obvious, of course, that I may provide a rubber channel strip over the upper and forward edge of my windshield, as shown in Callahan Patent No. 1,980,976, November 20, 1934, and that I may use ball and socket pivots similar to those shown in said patent instead of the straight bolt pivots I show in this application.

Having described my invention, I claim:

1. In combination, an automobile door provided with a window opening therein fitted with a sliding glass, the forward and upper and lower edges of the opening including the upper and lower forward corners thereof being defined by a single continuous strip of sheet metal forming a frame, said frame projecting outwardly of the plane of the window opening along said forward upper and lower edges and the outer edge of the outwardly projecting portions extending rearwardly and divergently outwardly of the forward edge of the window opening, a generally vertical glass shield within said frame with its upper and lower edges extending substantially parallel to and adjacent the outer edge of the outwardly projecting portion thereof and the forward edge of the shield being positioned adjacent the outer side edge of the forward portion of the frame, means pivotally securing said shield to said frame, for pivoting on a generally vertical axis for movement relative thereto and the outer edge of the portion of the frame adjacent the upper edge of the glass being turned upwardly to coact with the outer side of the door for forming a channel to drain rain forwardly and downwardly over the portion of the frame extending over the forward edge of the shield.

2. An automobile side wing comprising a glass shield with rounded forward corners adapted to be positioned generally vertically across the forward portion of an automobile window opening in a plane extending divergently rearwardly of the frame of the opening from the forward edge defining said opening, supporting means for the shield comprising a frame formed of an elongated strip of flat sheet metal extending along and over the upper, forward and lower edges of the shield including the rounded forward corners thereof and following the outline of the shield in shape, means at the upper and lower edges of the shield pivotally securing the shield to the frame for pivotal movement of the shield relative to the frame, means for securing the frame to the automobile at the upper and lower edges of the window opening, said frame being adapted to fit within the window opening along one edge and to extend transversely across the edge of said opening to the outer side of the automobile, the opposite edge of the frame being turned outwardly along that portion thereof extending along the upper and forward edge of the shield including the upper forward corner thereof and the ends of the frame terminating rearwardly of the upper and lower rear corners of the shield in outwardly turned ends to deflect the wind upwardly and downwardly respectively.

3. A side windshield for an automobile window opening comprising a substantially U-shape frame disposed on its sides in a generally vertical plane and adapted to be secured to the automobile with the opposite sides of the U-frame adjacent the upper and lower edges of the window opening and horizontally across the upper and lower edges of the opening and with the connecting side opposite the open end of the U-frame positioned adjacent the forward edge of the window opening, a generally vertical glass shield, means mounting said glass shield on said frame on generally vertical pivots with its upper, forward and lower edges positioned closely adjacent the upper forward and lower sides of the frame, said pivots being respectively disposed at the upper and lower edges of the shield at points spaced from the forward edge of the frame whereby the forward edge of the shield will swing away from the forward side of the frame upon pivoting the shield for permitting circulation of air between the forward side of the frame and forward edge of said shield, the forward side of said frame being formed to permit swinging the forward edge of the shield to a position within the window opening and behind the forward edge of the opening when the frame is secured to the automobile.

4. A side wing for an automobile window opening fitted with sliding glass comprising an elongated strip of sheet metal bowed longitudinally of its length and perpendicularly to the plane of the sheet to form a substantially U-shape frame adapted to be disposed on its side and to extend across the edge of that portion of the opening to the outer side of the sliding glass along the upper, forward and lower edges of said portion, a generally vertical glass shield positioned within said frame with the frame at its upper and lower sides extending over the upper and lower edges of the shield and the forward edge of said shield positioned closely adjacent the outer side edge of the metal strip, means pivotally securing said shield to the strip arranged and adapted to permit swinging of the shield about a generally vertical axis for moving the forward edge of the shield away from the forward side of the frame and means formed on the inner side edge of the upper, forward and lower sides of the frame adapted to engage the inner side of the aforesaid portion to the window opening for securing the frame in the window opening.

5. In an automobile side wing, a glass shield adapted to be positioned generally vertically across the forward portion of an automobile window opening in a plane extending divergently outwardly of the plane of the window opening from the forward edge of the opening, supporting means for the shield comprising an elongated continuous strip of sheet metal extending along and over the upper, forward, and lower edges of said shield including its forward corners, said strip being wider adjacent the rear edge of the shield and extending convergently therefrom to a relatively narrow forward portion adjacent the forward edge of the shield, and the strip being formed to define the outline of the forward portion of the window opening with the relative narrow forward portion being angularly turned outwardly relative to the plane of the strip along the edge thereof adjacent the outer side of the edge of the window opening and extending substantially parallel to the edge of the opening and pivots disposed at the upper and lower edges of the shield arranged and adapted to secure the shield to the strip and to permit pivoting the shield relative to the strip on a generally vertical axis.

6. An automobile side wing comprising a glass shield with rounded forward corners, said shield being adapted to be positioned generally vertically across the forward portion of an automobile window opening in a plane extending divergently rearwardly and outwardly of the plane of the opening from the forward edge of the opening, supporting means for the shield comprising a frame formed of a single elongated strip of flat sheet metal bowed longitudinally thereof and extending along and over the upper, forward, and lower edges of the shield including the rounded forward corners of the shield and following the outline of the shield in shape, means at the upper and lower edges of the shield pivotally securing the shield to the frame for pivotal movement of the shield on said pivots relative to the frame, means for securing the frame to the automobile at the upper and lower edges of the window opening, said frame being formed to fit within the window opening along one longitudinally extending edge and to extend transversely across the edge of the window opening to the outer side of the automobile, and the means pivotally securing the shield to the frame being positioned adjacent the opposite longitudinally extending edge of the frame at points intermediate the forward and rear edges of the shield.

7. An automobile side wing comprising a glass shield with rounded forward corners, said shield being adapted to be positioned generally vertically across the forward portion of an automobile window opening in a plane extending divergently outwardly of the plane of the window opening from the forward edge of the opening, supporting means for the shield comprising a frame formed of a single elongated strip of flat sheet metal bowed longitudinally thereof and extending along and over the upper, forward, and lower edges of the shield including the rounded forward corners of the shield and following the outline of the shield in shape, means at the upper and lower edges of the shield pivotally securing the shield to the frame for pivotal movement of the shield on said pivots relative to the frame, means for securing the frame to the automobile at the upper and lower edges of the window opening, said frame being formed to fit within the window opening along one longitudinally extending edge and to extend transversely across the edge of the window opening to the outer side of the automobile, the opposite longitudinally extending edge being turned outwardly along that portion thereof extending along the upper and forward edges of the shield including the upper forward corner thereof, and the ends of the frame terminating adjacent the upper and lower rear corners of the shield.

8. In an automobile side wing including a generally vertically disposed glass shield adapted to be positioned across the forward portion of one of the door window openings in the side of an automobile that is fitted with sliding glass, a generally U-shape frame disposed on its side with the opposite sides of the U-frame disposed in a generally vertical plane and the frame being adapted to be secured to the automobile with a portion of said opposite sides of the frame respectively being formed to extend horizontally across the upper and lower edges of the window opening and to engage against the inner side of that portion of the door at the edge of the opening and adjacent the sliding glass, the side of the frame at the end of the U being adapted to extend along the forward edge of the opening, means pivotally securing said glass shield within said frame and supporting said shield with its forward edge positioned within the window opening adjacent and behind the forward edge of said opening when the frame is secured to the automobile, said pivots being arranged to permit swinging the forward edge of the shield outwardly of the door and from behind said forward edge of the opening.

9. A frame for supporting a side windshield in position adjacent the forward edge of a side window opening of an automobile comprising an elongated strip of sheet metal bowed longitudinally to fit along its outer side against the inwardly facing edges of the upper, forward and lower reveals of said window opening, including the forward corners, along one of the longitudinally extending edges of the frame, said strip of sheet metal being relatively resilient whereby the frame is adapted to spring longitudinally and transversely of the plane of the metal of the strip to conform along said longitudinally extending edge to variations in the outline of the window opening upon being fitted in the window opening, and means spaced from the aforesaid longitudinally extending edge at the upper and lower sides of the frame for supporting a glass shield for pivotal mounting on said frame.

EMMETT E. WOODWARD.